United States Patent
O'Connor et al.

(10) Patent No.: US 9,591,134 B2
(45) Date of Patent: Mar. 7, 2017

(54) METHOD AND SYSTEM FOR DETERMINING OCCUPANCY OF RESOURCES IN A MULTIMODAL CONTACT CENTER

(71) Applicant: Avaya Inc., Santa Clara, CA (US)

(72) Inventors: Neil O'Connor, Galway (IE); Robert C. Steiner, Westminster, CO (US); John McGreevy, Galway (IE); Tony McCormack, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 281 days.

(21) Appl. No.: 14/278,690

(22) Filed: May 15, 2014

(65) Prior Publication Data

US 2015/0334233 A1    Nov. 19, 2015

(51) Int. Cl.
   *H04M 3/51*     (2006.01)
   *G06F 17/30*    (2006.01)
   *G06Q 10/06*    (2012.01)

(52) U.S. Cl.
   CPC .......... *H04M 3/51* (2013.01); *G06F 17/3053* (2013.01); *G06F 17/30864* (2013.01); *G06Q 10/063114* (2013.01); *H04M 3/5175* (2013.01); *H04M 3/5183* (2013.01)

(58) Field of Classification Search
   CPC .......... G06F 17/3053; G06F 17/30864; G06Q 10/063114; H04M 3/51; H04M 3/5175; H04M 3/5183
   USPC ........................................ 379/265.01–265.14
   See application file for complete search history.

(56) References Cited

U.S. PATENT DOCUMENTS

| | | | |
|---|---|---|---|
| 2003/0099343 A1* | 5/2003 | Dezonno | H04M 3/5191 379/265.11 |
| 2003/0179729 A1* | 9/2003 | Beck | G06F 17/2765 370/328 |
| 2012/0057691 A1* | 3/2012 | Moran | H04M 3/42221 379/265.02 |
| 2012/0300920 A1* | 11/2012 | Fagundes | H04M 3/523 379/265.05 |
| 2013/0083915 A1* | 4/2013 | Flockhart | H04M 3/5233 379/265.11 |

* cited by examiner

*Primary Examiner* — Harry S Hong (57) ABSTRACT

A method and system for determining occupancy of an agent in a multimodal contact center are provided. The method includes monitoring, by a processor, a plurality of multimodal contacts simultaneously handled by an agent. For each contact of the plurality of multimodal contacts, a media capability of a contact may be determined and one or more parameters based on the media capability and the agent may be determined. A multimodal occupancy score for the agent based on the one or more parameters for each of the plurality of multimodal contacts.

20 Claims, 5 Drawing Sheets

METHOD AND SYSTEM FOR DETERMINING OCCUPANCY OF RESOURCES IN A MULTIMODAL CONTACT CENTER

BACKGROUND

Field of the Invention

Embodiments of the present invention generally relate to contact centers and particularly to a method and system for determining occupancy of one or more agents in a multimodal contact center.

Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts (i.e., customers). Contact centers distribute contacts, whether inbound or outbound, for providing service to any suitable resource according to predefined criteria. In many existing systems, the criteria for serving the contact from the moment the contact center becomes aware of the contact until the contact is connected to an agent are client or operator-specifiable (i.e., programmable by the operator of the contact center), via a capability called vectoring. Normally in present-day Automatic Call Distributors (or ACDs) when the ACD system's controller detects an agent has become available to handle a contact, the controller identifies all predefined contact-handling queues for the agent, usually in some order of priority and delivers to the agent the highest-priority, oldest contact that matches the agent's highest-priority queue.

The primary objective of contact center management is to ultimately maximize contact center performance and profitability. That may involve minimizing cost, maximizing contact throughput, and/or maximizing revenue. Further, ongoing challenges in contact center administration involve optimizing contact center efficiency and keeping the customers satisfied from the service offered by the contact center.

Currently, contact center occupancy is measured by the percentage of time an agent is working within a given interval. In traditional contact centers, the only media capability an agent is using is voice via telephone calls. Occupancy often refers to information such as talk time and after call work time as periods that constitute work time. An agent's occupancy is a measure of how efficiently an agent's time is used. If an agent today were to work constantly from login to logout, the agent would be 100% occupied. The general rule of thumb within the call center industry is to aim for an agent to be 80-85% occupied so as not to overwork the agent.

Calculating the occupancy of an agent who is dealing with a plurality of simultaneous multimodal contacts is difficult. Call centers today do not need to be limited to just contacts via a voice capability. Instead, various media capabilities may be used in a contact center system. However, even though a customer may communicate with an agent using various media capabilities, there is currently no way to determine the occupancy of that agent who can handle multimodal contacts at one time. For example, at the present time, there is no way to determine the occupancy of a person who is dealing simultaneously with voice, chat, email and/or any other form of customer interaction.

Present solutions only determine occupancy of an agent using a voice capability. As an agent cannot handle multiple simultaneous voice calls, an agent with a contact having a voice capability is currently 100% occupied and an agent who is not on a voice call, and not doing after call work, is 0% occupied. This "all or nothing" approach to occupancy leads to a very inefficient multimodal system as an agent can handle multiple contacts with, for example, web or email media capabilities, at a time. Handling simultaneous media capabilities is possible and is often necessary for an agent to be occupied. For example, an agent would not be 100% busy working on a contact that has an email capability. However, there was formerly no known way to determine occupancy in a multimodal scenario, such as the occupancy of a call center agent who is both responding to an email and simultaneously answering live chat questions. Similarly, for example, an agent answering a text message can easily have more than one open message at the same time as a customer may spend time writing a message and the agent may be waiting for a response from the customer. As such, there is a need to determine an agent's occupancy in a multimodal contact center.

There are many advantages to a multimodal contact center. By allowing an agent to participate in simultaneous multimodal contacts, a customer's wait time to communicate with an agent may be decreased. Contact centers wish to provide service to as many requests as possible in a given amount of time and a multimodal contact center may allow more requests to be serviced and minimize the wait time for their customers. Accordingly, there is a need to determine the occupancy of an agent who has simultaneous contacts in a multimodal environment.

Furthermore, in addition to only considering contacts with a voice capability, such as a telephone call, the current occupancy calculation up to now does not consider any other demands on an agent that are distinct to the contact. For example, current occupancy scores for an agent do not take into account whether a particular contact was easy or difficult for the agent. For example, if the contact is a customer complaint, the agent has a much more difficult phone call then if the call is a sales-related question. Demands on agents may be considered in the occupancy of an agent in order to reduce agent burnout.

In addition to current demands on an agent, simultaneous contacts with different media capabilities may bring new demands on agents. For example, it may take the agent time to switch from one media capability to another media capability. Furthermore, some media capabilities may be more difficult for an agent than other media capabilities. For example, responding to a customer via an email may be easier for an agent than responding to customer via a phone conversation. As such, the occupancy of an agent must take into account the varying demands placed on the agent responding to simultaneous contacts in a multimodal contact center.

Aspects of the agent's work that are uniquely demanding depending on the media capability of the contact handled by the agent and the multiplicity of demands placed on an agent are not currently taken into account when determining the occupancy of the agent. By ensuring the new demands on an agent handling the various media capabilities within a contact center are considered, agent burnout can be decreased and staff turnover can be reduced. It is with respect to these and other considerations that improvements have been needed.

Based on the aforementioned shortcomings of the background art, a system and method are needed to determine the occupancy of agents in a multimodal call center and in turn further improve agent utilization and customer satisfaction. Thus, the contact center should be able to implement methods for enhancing overall multimodal performance of the contact center.

SUMMARY

Embodiments in accordance with the present invention provide a system to determine occupancy of an agent in a multimodal contact center. A goal of the determination is to calculate a multimodal occupancy score for an agent. The method may include determining the media capability of each contact. Further, the method may include determining parameters associated with the media capability, the contact and the agent handling the contact. The parameters associated with each contact may be used to calculate a multimodal occupancy score of an agent.

Embodiments in accordance with the present invention further provide a system to determine occupancy of an agent in a multimodal contact center. The system may include a simultaneous contacts module configured to monitor a plurality of multimodal contacts simultaneously handled by an agent. The system may also include a media capability module configured to determine a media capability based on a contact for each of the plurality of multimodal contacts and determine one or more parameters based on the media capability of the contact. The system may further include an occupancy calculation module configured to calculate a multimodal occupancy score for the agent based on the one or more parameters for each of the plurality of multimodal contacts.

Embodiments in accordance with the present invention further provide a computer-implemented method to determine occupancy of an agent in a contact center. The method may include monitoring, by a processor, a plurality of multimodal contacts simultaneously handled by an agent and for each contact of the plurality of multimodal contacts, determining a media capability of a contact and determining one or more parameters based on the media capability and the agent. The method may include calculating a multimodal occupancy score for the agent based on the one or more parameters for each of the plurality of multimodal contacts.

Embodiments in accordance with the present invention further provide a computer readable medium storing computer readable instructions when executed by a processor perform a method comprising monitoring a first contact and a second contact simultaneously handled by an agent, determining a first media capability of the first contact and a second media capability of the second contact, determining one or more parameters based on the media capability of the first contact and one or more parameters based on the media capability of the second contact, and calculating a multimodal occupancy score for the agent based on the one or more parameters of the first contact and the one or more parameters of the second contact.

Embodiments of the present invention provide a number of advantages that may include a model based approach to optimally determining the occupancy of an agent in a multimodal contact center. Specifically, the embodiments of the present invention may provide improved metrics for determining occupancy for agents who use multiple media capabilities within a contact center. The multimodal occupancy score of an agent may include aspects of the agent's work that are uniquely demanding based on the media capabilities and the multiplicity of contacts simultaneously placed on the agent. Additionally, embodiments of the present invention may establish a mathematical model of the multimodal occupancy of agents in the call center. This will allow optimal occupancy to be determined for a call center with contacts in multiple media capabilities. Determining an optimal occupancy will increase customer satisfaction while reducing agent burnout.

Based on the aforementioned and other additional advantages, embodiments of the present invention provide an automated and model-based approach to determining occupancy in a multimodal contact center. Accordingly, embodiments of the present invention can provide an improvement in multimodal contact center throughput, agent utilization and customer service level.

These and other advantages will be apparent from the disclosure of the present invention contained herein.

The preceding is a simplified summary of the present invention to provide an understanding of some aspects of the present invention. This summary is neither an extensive nor an exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The present invention will be illustrated below in conjunction with an exemplary communication system.

Although well suited for use with, e.g., a system having an ACD or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

Figure 1:
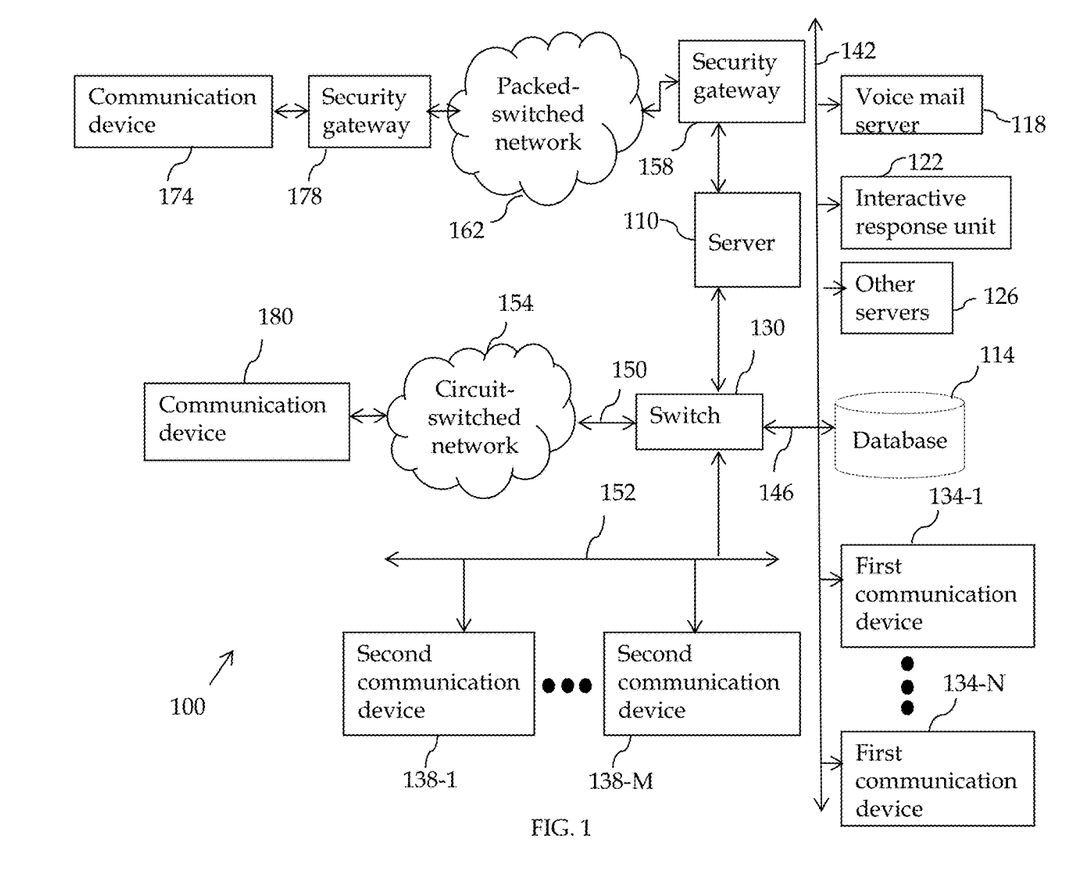
FIG. 1 depicts a contact center according to an embodiment of the present invention.

FIG. 1 shows an illustrative embodiment of a multimodal contact center, in accordance with one embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Response unit (e.g., IVR) 122, and other servers 126, a switch 130, a plurality of working agents operating packet-switched communication devices 134-1 to N such as computer work stations or personal computers, and/or circuit-switched communication devices 138-1 to M, all interconnected by a communication network such as local area network ("LAN") 142 and/or wide area network ("WAN"). The servers can be connected via optional communication lines 146 to the switch 130. As will be appreciated, the other servers 126 can also include a scanner that is normally not connected to the switch 130 or Web server, VoIP software, video call software, voice messaging software, an IP voice server, a fax server, a web server, an email server, and the like. The switch 130 is connected via a plurality of trunks 150 to the Public Switch Telephone Network or PSTN 154 and via link(s) 152 to the second communication devices 138-1 to M. A gateway 158 is positioned between the server 110 and the packet-switched network 162 to process communications passing between the server 110 and the network 162.

Further, the gateway 158 can be, but is not limited to, Avaya Inc.'s, G700 Media Gateway™ and may be implemented as hardware such as via an adjunct processor or as a chip in the server.

The server 110 may be in communication with a plurality of customer communication lines, which can be one or more trunks, phone lines, etc., and agent communication line, which can be a voice-and-data transmission line such as LAN 142 and/or a circuit switched voice line. The server 110 may include an operational contact center reporting module (not shown), such as, but not limited to, Avaya IQ™, CMS™, Basic Call Management System™, Operational Analyst™, and Customer Call Routing or CCR™ by Avaya, Inc., that may gather call records and contact-center statistics for use in generating contact-center reports.

The switch 130 and/or server 110 can be any architecture for directing contacts (i.e., customers) to one or more communication devices. In some embodiments, the switch 130 may perform load-balancing functions by allocating incoming or outgoing contacts among a plurality of logically and/or geographically distinct contact centers. Illustratively, the switch and/or server may be a modified form of the subscriber-premises equipment sold by Avaya Inc. under the names Definity™ Private-Branch Exchange (PBX)-based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

The first communication devices 134-1, . . . 134-N are packet-switched and may include, for example, hardware-based IP phones such as, but not limited to, the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1, . . . 138-M are circuit-switched. Each of the communication devices 138-1, . . . 138-M may correspond to one of a set of internal extensions Ext1, . . . ExtM, respectively. The second communication devices may include, for example, wired and wireless telephones, PDAs, H.320 videophones and conferencing units, voice messaging and response units, traditional computer telephony adjuncts, and any other communication device.

It should be noted the present invention does not require any particular type of information transport medium between switch or server and first and second communication devices, i.e., the present invention may be implemented with any desired media capabilities, type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with a first communication device 174 via a gateway 178, and the circuit-switched network 154 with an external second communication device 180.

In a configuration, the server 110, network 162, and first communication devices 134 are Session Initiation Protocol or SIP compatible and may include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized the configuration of the switch, server, user communication devices, and other elements as shown in FIG. 1 is for purposes of illustration only and should not be construed as limiting the present invention to any particular arrangement of elements.

Although the embodiment is discussed with reference to a client-server architecture, it is to be understood the principles of the present invention may apply to other network architectures. For example, the present invention applies to peer-to-peer networks, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the present invention may not require the presence of packet- or circuit-switched networks.

Figure 2:
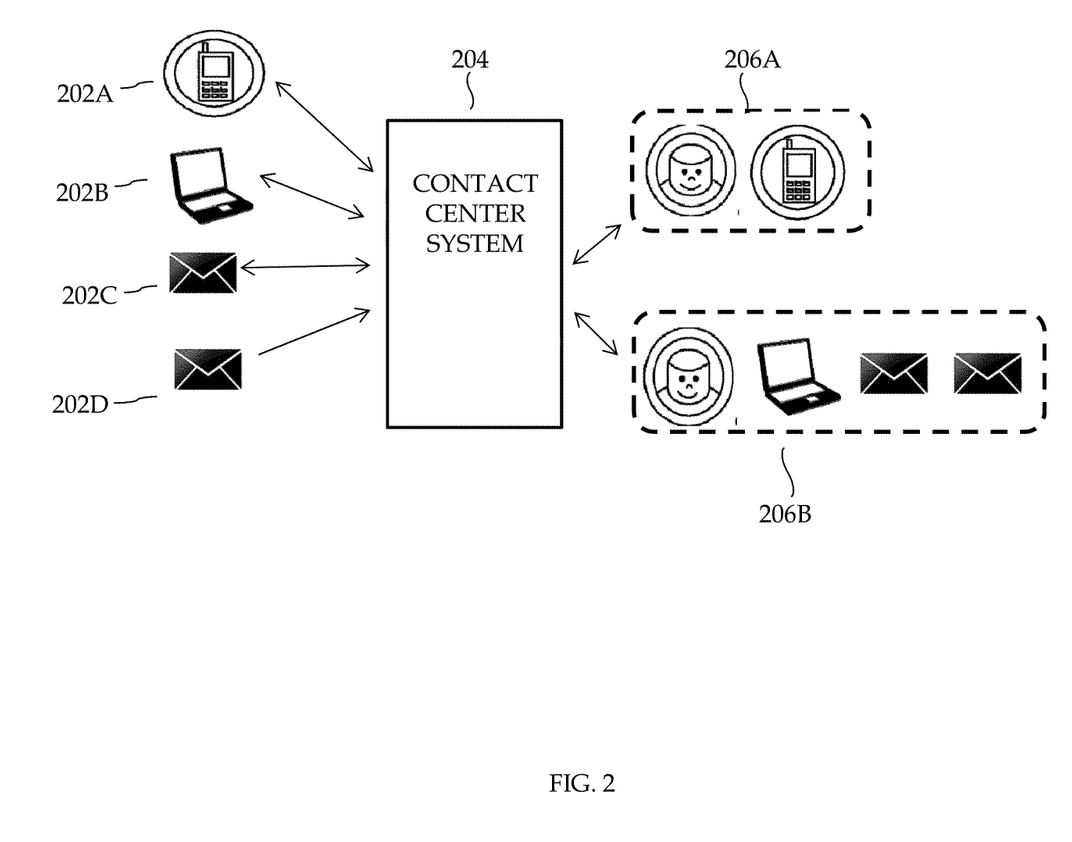
FIG. 2 depicts the contact center system of FIG. 1 determining occupancy of an agent with simultaneous multimodal contacts, according to an embodiment of the present invention.

FIG. 2 depicts a block diagram of a contact center system determining occupancy of an agent with simultaneous multimodal contacts, in accordance with one embodiment of the present invention. In an embodiment, contacts 203A-D may be sent from customers to the contact center system 204 using a variety of media capabilities. In contrast to the traditional systems where an agent only handled a single contact at a time, FIG. 2 depicts an agent handling multiple simultaneous contacts of various media capabilities or modes. A media capability is a form of media communication and includes a communication channel. Media capabilities may include, but are not limited to, a web capability, a text capability, a voice capability and/or a video capability. The media capabilities may vary in characteristics like bandwidth requirement, the latency of support (i.e., how close to real-time, immediacy, responsiveness, etc.), the level of participation by the agent, usage of other system resources, and so forth. For example, an email capability uses relatively little bandwidth and there may be a moderately high tolerance for latency. In contrast, a voice capability uses relatively more bandwidth and a video capability uses even more bandwidth. Media capabilities may be contacts in the form of emails, web chats, instant messages, phone calls and video calls. In an embodiment, the agent may be able to simultaneously handle one or more of voice, chat, email and/or other media capabilities of contacts.

The customer contacts 202A-D sent to the multimodal contact center system 204 may include a variety of media capabilities. Customer contact 202A may include a voice capability. The voice capability may include a voice call. The contact center system 204 may route the voice call to agent 206A. Customer contact 202B may include a web capability. The web capability may include, but is not limited to, a web chat. Additionally, customer contacts 202C and 202 D may include a text capability such as, but not limited to, an email. The contact center system 204 may determine whether the incoming contact has a web capability or an email capability and may send it to an agent based on the agents' occupancy and/or whether the agent also has that capability. In an embodiment, an agent may be determined to have a multimodal occupancy score of 90% by handling a customer phone call 202A. The contact center system 204 may determine the agent does not have the ability to handle another contact as the phone call will keep the agent occupied. In an alternative embodiment, agent may be determined to have a multimodal occupancy score of 100% by handling a customer phone call 202A to ensure the agent is not given another contact.

The contact center system 204 may route the web capability of customer contact 202B to agent 206B. The contact center system 204 may determine the agent 206B has a multimodal occupancy score of 75% based on handling the web chat contact 202B. The contact center system 204 may determine the agent has the ability to handle another customer contact with a different media capability. The contact center system 204 may determine that having agent 206B handle the first email contact 202C gives agent 206B a multimodal occupancy score of an additional 5% and may also send a second email contact 202D, which gives agent 206B a multimodal occupancy score of an additional 10%. After assigning agent 206B the web chat contact 202B, a first email contact 202C and a second email contact 202D, agent 206B may have a total multimodal occupancy score of 90% (75%+5%+10%).

Figure 3:
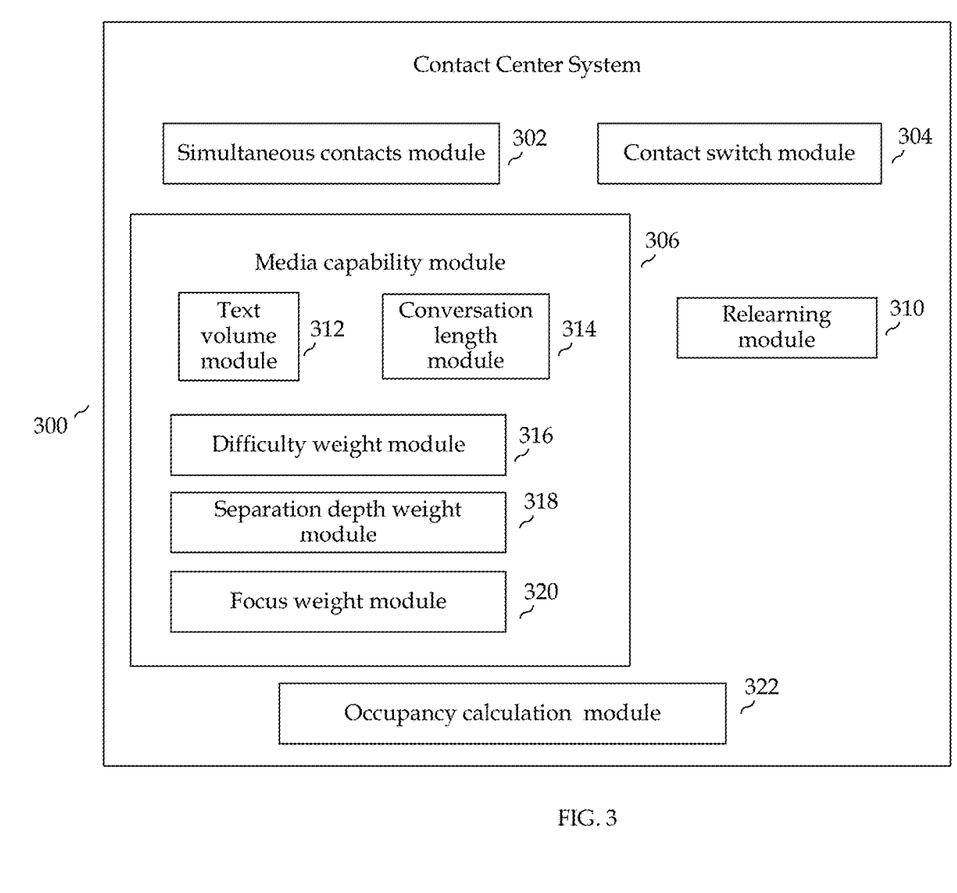
FIG. 3 depicts various modules of the contact center system of FIG. 1 determining occupancy of an agent with simultaneous multimodal contacts, according to an embodiment of the present invention.

FIG. 3 illustrates an exemplary embodiment of a block diagram to illustrate various modules of a contact center system 300 determining occupancy of an agent with simultaneous multimodal contacts, in accordance with an embodiment of the present invention. The contact center system 300 may include multiple modules to determine the occupancy of agents in the system. Multiple modules may determine the occupancy of an agent handling multiple simultaneous contacts using a variety of media capabilities.

The contact center system 300 include a simultaneous contacts module 302, a contact switches module 304, a media capability module 306 and a relearning module 310. The media capability module 306 may include modules for specific types of media. For example, for text capabilities, there may be a text volume module 312 and for voice capabilities, there may be a conversation length module 314. Further, the media capability module may include a difficulty weight module 316, a depth of separation weight module 318, and a focus weight module 320.

In an embodiment, the simultaneous contact module 302 may determine how many simultaneous contacts an agent is handling. The contact center system 300 may determine what is 100% occupied for an agent with the ability to handle multiple simultaneous contacts with different media capabilities. In an embodiment, the contact center system 300 may determine the number of simultaneous contacts handled by an agent to have a multimodal occupancy score of 100% may vary based on the media capabilities of the contacts. For example, an agent may have a multimodal occupancy score of 100% when the agent has three simultaneous contacts, where the first contact has a web capability, and the other two contacts have email capabilities. In an alternative example, an agent may have a multimodal occupancy score of 100% when the agent has four simultaneous contacts, where all four contacts have email capabilities.

In an embodiment, the 100% multimodal occupancy score determined by the simultaneous contact module 302 may create a baseline for determining a particular agent's multimodal occupancy score. A variety of factors may be used in determining the multimodal occupancy score for a particular agent with particular contacts. In addition to the number of contacts, measures to determine occupancy may include the additional demands placed on agents that are distinct to the specific nature of the contact. In an embodiment, the multimodal occupancy score for an agent may be based on the one or more parameters associated with the media capability of each contact handled by the agent.

In an embodiment, the media capability module 306 may determine the media capability of a particular contact. The media capability module 306 may determine parameters based on the media capability or mode of the contact. The parameters may be part of determining a multimodal occupancy score for the agent. For example, the media capability module 306 may use a text volume module 312 to determine the volume of text parameter.

The volume of text parameter may refer to the amount of incoming text an agent must read as well as the amount of outgoing text an agent must type to a customer. In an embodiment, the volume of incoming text may be affected by the textual sentiment of the customer, as an angry customer is more likely to write a high volume of text the agent needs to read. Additionally, the angry customer may require the agent to type more in order to settle or comfort the angry customer. For example, an angry customer may spend five minutes typing in a chat window and the agent must read this text. The agent also has to respond to all the points made in the text by the angry customer. As a result, the volume of text parameter may be high and the contact may require more time from the agent than a non-angry contact. The multimodal occupancy score of the agent may be increased due to the high volume of text parameter. An increased multimodal occupancy score means the agent can handle fewer additional contacts in order to allow the agent to focus on the web chat with the angry customer. In alternate embodiments, customers may have large volumes of text, regardless of their textual sentiment, and the multimodal occupancy score may be determined based on the length of the customer's volume of text parameter.

In addition, the text volume module 312 may determine the volume of text parameter based on whether the text entered by the agent is auto-generated or non-auto-generated. In an embodiment, the volume of non-auto-generated text entered by the agent per contact response may be used in the determination of the volume of text parameter and thus used in the multimodal occupancy score of an agent. For example, an agent that just has to cut and paste a response is not as busy as an agent who has to think through a response and write it prior to sending it back to the customer. The time and skill required for an agent to create their own response may be part of the multimodal occupancy score calculation. The volume of text parameter may be compared to a baseline number of words per a time interval. The baseline may be a 100% multimodal occupancy score for the contact center. In an embodiment, the baseline may be a particular number of words per a time interval. For example, 20 words per a time interval may be the baseline for the volume of text parameter. Alternatively, 15 words per a time interval may be the baseline for the volume of text parameter.

In an embodiment, the media capability module 306 may include a conversation length module 314. A conversation length module 314 may determine a conversation length parameter to calculate a multimodal occupancy score of an agent. The conversation length module 314 may use the conversation length parameter for a contact with a voice capability. The length of a conversation may refer to one or more of the agent speaking and/or the customer speaking. For example, if the customer is verbose, the agent may need to be on the phone longer than if the customer is succinct. The length of the conversation parameter may affect the multimodal occupancy score of the agent. Additionally, if the customer asks questions that are very time consuming for an agent to answer, then the length of the conversation parameter may be longer and will affect the multimodal occupancy score of the agent.

In addition to modules for media specific capabilities discussed above, the media capability module 306 may include other modules to determine parameters which affect the multimodal occupancy score. The parameters or weights may be based on the contact, the media capability of the contact and/or the agent. These parameters may be determined by a difficulty weight module 316, a depth of separation weight module 318 and/or a focus weight module 320.

The difficulty weight module 316 may determine a difficulty weight for the contact handled by the agent. The difficultly weight module 316 may take into account the difficulty for an agent in processing the contact. For example, processing a survey may be considered to be less difficult than processing a complaint. In an embodiment, the textual sentiment for a contact with a text capability may be used in determining the difficulty of the contact. The textual sentiment refers to how a customer uses language written to the agent. The textual sentiment may be important in a difficulty weight as an angry customer is more difficult to process and/or more stressful to deal with for an agent than a happy customer. This is because an angry customer is harder for an agent to emotionally deal with than a happy customer as an agent is often yelled at but needs to remain calm when speaking with the customer. In an embodiment, the textual sentiment may contribute to the overall difficulty weight determined by the difficulty weight module 316.

In addition to including the textual sentiment, the difficultly weight module 316 may also include the media capability in the determination of the difficulty weight. For example, a contact with an email capability may be considered to be more difficult for an agent than a contact with a web chat capability. In an embodiment, the difficulty weight of an email or chat may be calculated using the total word count or any other existing difficult weight formulas.

In an embodiment, the difficulty weight module 316 may have a baseline value for a difficulty weight. For example, the baseline value for a normal or regular level of difficulty weight may be 1. As such, a regularly difficult weight for a contact may not change the multimodal occupancy score of an agent. However, a difficult contact may be determined by the difficulty weight module 316 to have a difficulty weight greater than one. A difficultly weight of greater than one may increase the occupancy of the agent. For example, an agent that has a contact with a difficulty weight of 1 will need to have more contacts to remain occupied than an agent handling a contact with a difficulty weight of 1.25.

In an embodiment, the difficulty weight module 316 may modify the difficultly weight based on the skill level of an agent. For example, a highly skilled agent may have less difficulty handling a particular contact than a less skilled agent. As such, the difficulty weight may be adjusted based on the agent's skill level. A highly skilled agent may decrease the difficulty weight while a newly trained and less skilled agent may increase the difficulty weight. For example, for a particular contact, a less skilled agent may have a difficulty weight of 1 based on the contact while a more skilled agent may have a difficulty weight of 0.5 based on the same contact. As such, the more skilled agent may have a lower multimodal occupancy score, as a result of the lower difficulty weight, and the more skilled agent may be available to take on additional contacts.

Referring to FIG. 3, the depth of separation weight module 318 may determine a depth of separation weight when an agent changes from one contact to another. In an embodiment, the depth of separation weight may be determined based on the media capability of the first contact when compared to the media capability of the second contact. For example, it may be difficult for an agent to start a phone conversation with a customer after having written emails to customers. As such, the depth of separation weight may be increased from a baseline separation weight of 1.

In another embodiment, the depth of separation weight may be determined based on the contact. For example, an agent switching from a first call with a programmer to a second call with a lawyer requires a different use of language and skills. As such, it may be more difficult for an agent to switch from talking to a programmer to talking to a lawyer than for an agent to switch from talking to a programmer to talking to another programmer. Similarly, the switching of an agent from a complaint contact to a sales contact may have a large depth of separation weight. However, a switch between a support contact and a complaint contact may have a small depth of separation weight. The depth of separation weight may be adjusted and increased from a regular depth of separation weight in order to take into account a difficult switch between contacts when determining the multimodal occupancy score of the agent.

In an embodiment, the focus weight module 320 may determine a focus weight for an in-focus contact and a focus weight for one or more out of focus contacts. A focus weight for an in-focus contact may require a greater focus weight than an out of focus contact. The focus weight module 320 may determine which of the simultaneous contacts are out of focus and which contact is in-focus for an agent. For example, an agent may handle multiple customers at a time via web chat. However, an agent only writes on a single window at a time. As such, the window which is written on by the agent is the in-focus contact and the other windows are the out of focus contacts. In an embodiment, a first focus weight for an in-focus contact may be greater than a second focus weight for an out of focus contact. The total focus weight of an agent may be determined by the focus weight module 320. In an embodiment, the focus weights may add to the value of 1. The customer may have three simultaneous contacts. The in-focus contact may be given a focus weight of 0.6. The other two out of focus contacts may be each given a focus weight of 0.2. Thus the total of the three focus weights is 1. Alternatively, the focus weights may add to numbers greater or less than 1.

In an embodiment, the focus weight may be different for contacts based on the media capability. A first media capability may have a higher focus weight than a second media capability as there may be a time pressure to respond to the first media capability. For example, an agent must response quicker to a customer using a chat window than to a customer sending an email. An agent must respond to a chat window in 30 seconds or the customer may wonder if they are still connected. However, the agent has a greater time interval to respond to an email. For example, an in-focus phone call may require a higher focus weight than an in-focus web chat. Furthermore, an in-focus web chat may require a higher focus weight than an in-focus email.

In an embodiment, the focus weight may be based at least on one or more of the media capability and/or the skill of the agent. The focus weight module 320 may differentiate the focus weight based on the skill level of the agent. For example, the focus weight for a skilled agent may be lower than a focus weight for a less skilled agent.

An occupancy calculation module 322 may consider some or all of the modules discussed above to calculate a multimodal occupancy score. The occupancy calculation module 322 may use the baselines determined by the various modules to determine the occupancy of a particular agent. In an embodiment, the baseline at which an agent has a multimodal occupancy score of 100% may be an agent handling two chat sessions, switching between the chat sessions 4 times and sending 20 words over a predetermined text interval, the chat sessions are a separation weight of 1 and each chat session may have a difficulty weight of 1. Each time the chat is in-focus, the focus weighting may be a focus weight of 0.8 with the out of focus window having a focus weight of 0.2. The multimodal occupancy score may be calculated as:

Occupancy of an agent for a single contact=
((Contact switches/4)*(Words per text interval/20)*
(Difficulty weight)*(Depth of separation weight)*
(Focus weight)*100%

In an embodiment, an agent may currently have 2 chats, type 32 words per text interval, a difficulty weight of 1.25, a depth of separation weight of 0.08 and a focus weight of 1. Using the above equation, the occupancy score of the agent for a single chat may equal (2/4)*(43/20)*1.25*0.8*1*100%=80%

However, in order to determine the multimodal occupancy score of the agent over the time interval, the multimodal occupancy score calculation must be completed for each simultaneous contact handled by the agent. In the above example, there are two chats. The occupancy score above is shown for a single chat. In the example, the chat which was used to determine the multimodal occupancy score of the agent was the in-focus chat and given a weight of 1. The multimodal occupancy score may now be determined for the out of focus chat. In an embodiment, the multimodal occupancy score of the other chat may be 5%. As such, the total multimodal occupancy score of the agent over the time interval may be 85% (80%+5%).

The multimodal occupancy score may change when the agent switches from one contact to another. The contact switch module 304 may indicate when an agent switches from one contact to another. When an agent switches from one contact to another contact, an agent may become more occupied as the agent will need to ramp-up on the current contact. As a result, the multimodal occupancy score of the agent may increase for a predetermined number of intervals after a predetermined number of intervals have passed. The agent may only experience the increase in the multimodal occupancy score after a certain interval of time has passed in order to prevent an agent from unnecessarily switching between contacts to increase the multimodal occupancy score of that agent. If the agents can simply hop between open contacts to increase the multimodal occupancy score and therefore reduce the amount of contacts they are assigned, some agents will engage in this behavior. As such, when an agent switches from one contact to another, such as one chat window to another chat window, a time interval at a higher multimodal occupancy score may be allocated to the agent to allow the agent to become fully familiar with the contact again. In an embodiment, an interval of time may need to pass before the agent obtains the increase in the multimodal occupancy score to ensure the agent is handling the second contact.

For example, an agent may switch from a relatively easy survey contact to a more complicated complaint chat contact. After a waiting time interval, the multimodal occupancy score of the agent may be increased to allow the agent to catch-up on the more difficult and complicated complaint. The multimodal occupancy score of the agent may be 85% when handling the relatively easy survey contact. The difficulty weight may have been a 1. However, the second, more complicated, contact may have a difficulty weight of 1.1. As such, the multimodal occupancy score of the second contact may be 93.5% (1.1*85%). However, due to the agent switching from a first contact to a second contact, the multimodal occupancy score may be increased to allow the agent to catch-up on the second contact. In an embodiment, a catch-up interval may have a multimodal occupancy score of 100% in order to ensure the agent is not interrupted while they are catching-up.

As discussed above, the agent must wait a predetermined wait time interval before receiving the catch-up multimodal occupancy score of 100%. This waiting time interval may be necessary in order to ensure that the agent does not hop from one contact to another unnecessarily. Upon switching from the first contact to the second contact, the agent may immediately obtain the higher multimodal occupancy score of 93.5% associated with the second contact. The agent's multimodal occupancy score may remain at this level (of the second contact) for the predetermined wait time interval. In an embodiment, the contact switch module 304 may determine the wait time interval the agent must wait to obtain the multimodal occupancy score of 100%. For example, the agent may wait 15 seconds before having their multimodal occupancy score increased to 100% for the catch-up time.

The contact switch module may also determine a catch-up time interval the agent remains at the multimodal occupancy score of 100%. In an embodiment, the contact switch module may provide a baseline amount of time that an agent remains at the catch-up multimodal occupancy score. In an embodiment, the amount of time the agent remains at the catch-up multimodal occupancy score may be based, at least in part, on a skill level of the agent. An agent with a higher skill level will have a shorter interval at the catch-up multimodal occupancy score than a less skilled agent. The more skilled agent may have a shorter interval as the more skilled agent will be able to more quickly get caught-up on the more difficult contact. For example, the contact switching module 304 may determine that the agent can remain at the catch-up multimodal occupancy score for 15 seconds. However, the contact switching module 304 may determine that a highly skilled agent can only remain at the catch-up multimodal occupancy score for 10 seconds. Accordingly, after the predetermined time interval at the catch-up multimodal occupancy score of 100%, the agent may return to multimodal occupancy score of 93.5% for the second contact.

In an embodiment, the occupancy baseline, which is used to determine when an agent is 100% occupied, may be reevaluated by a relearning module 310. The call center system administrator and/or supervisor may input and determine the baseline values for the parameters. The relearning module 310 may learn from the agents in the system to determine and reevaluate the baseline values. The relearning module 310 may monitor one or more agents to reevaluate the parameters or weights. The relearning module 310 may adjust the parameters. The relearning module 310 may teach itself to reevaluate the parameters based on how busy the agents in the call center system are in responding to customer contacts. For example, the multimodal occupancy score of a group of agents may be collected and used as feedback into the contact center system to provide relearning.

The feedback may allow a redefinition of what 100% occupancy looks like and represents. This can then be used to adjust an agent's multimodal occupancy score. The relearning module 310 may monitor one or more agents to reevaluate one or more of the parameters associated with a media capability and/or contact. In an embodiment, a processor may be used to monitor the agents. In an embodiment, the relearning module could be controlled by a supervisor. In an embodiment, the values could be automatically fed back into the system so the relearning module 310 will self learn what 100% occupied looks like to the contact call center system. Alternatively, a blend of the supervisor control and the relearning may be used. For example, if an agent is 85% busy, but is still easily taking on new simultaneous contacts, then the current multimodal occupancy score may be revised by the relearning module 310.

The relearning module 310 may determine an agent with 4 text windows is not 85% occupied. Due to the multimodal occupancy score of 85%, the relearning module 310 may decrease the focus weight of the out of focus contacts. By reducing the out of focus weight, the multimodal occupancy score is decreased and the agent may need 5 text windows to remain 85% busy. In an embodiment, the relearning module may make changes to the multimodal occupancy score calculation on an each agent basis and/or on a whole contact center system basis. In an embodiment, the average of all agents may be calculated at a given time and used as a preloaded value for agents starting work to prevent a newly available agent from entering the system at a multimodal occupancy score of 0%.

Figure 4:
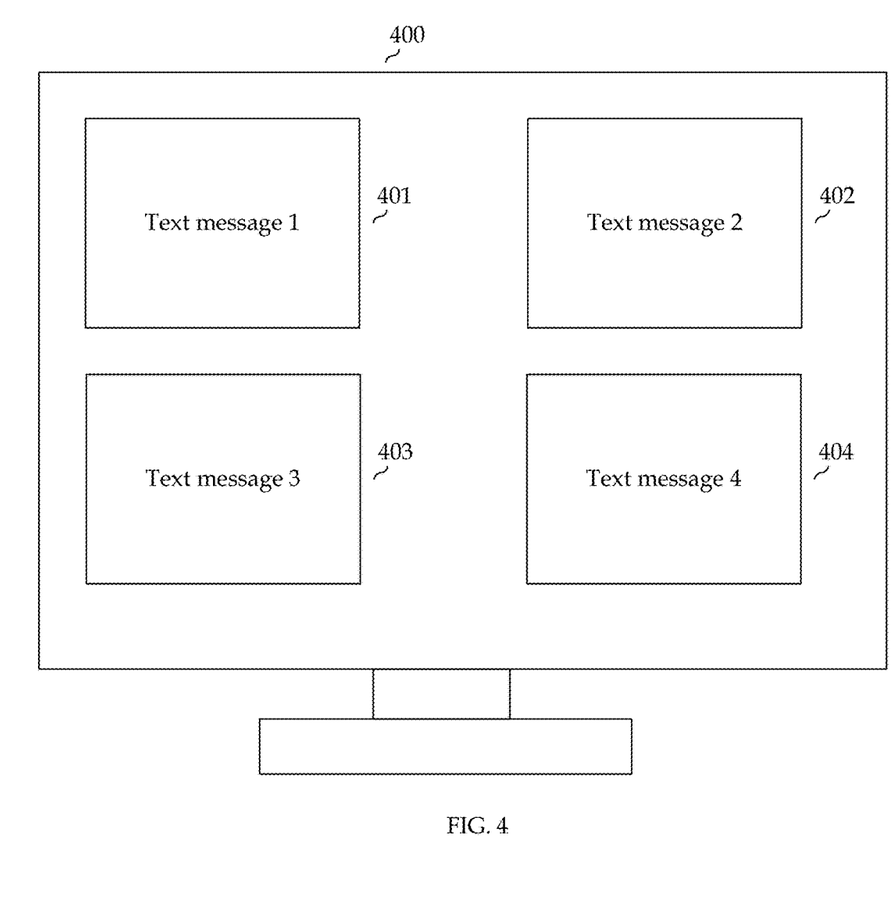
FIG. 4 depicts a diagram of an exemplary terminal of an agent simultaneously handling multiple contacts, according to an embodiment of the present invention.

FIG. 4 depicts a diagram of an exemplary terminal of an agent simultaneously handling multiple contacts, in accordance with one embodiment of the present invention. The computing device 400 may include four simultaneous contacts 401, 402, 403 and 404. In an embodiment, all four contacts may be of the same media capability. For example, all four contacts may be textual contacts, such as, but not limited to, text messages. An agent may have multiple open textual contacts. However, only one of those contacts can be in-focus and receive the text typed by an agent at a given time. The single contact in-focus will have the greatest impact on the occupancy of the agent. The out of focus contacts will have a lesser impact. However, all the open contacts that are handled by the agent will contribute to the agent's multimodal occupancy score.

The agent in FIG. 4 may have four chat windows open. However, the agent can only type in a single window at a time so the window in which the agent in typing is the in-focus contact and the other windows are out of focus contacts. Based on the calculation discussed below, occupancy score for the in-focus contact may be 70% and the out of focus contact could add 5% each to the agent's occupancy score giving the agent a total multimodal occupancy score of 85%. Accordingly, multiple open contacts increase the occupancy of the agent, but the main component of the occupancy of the agent is determined by the in-focus contact.

Figure 5:
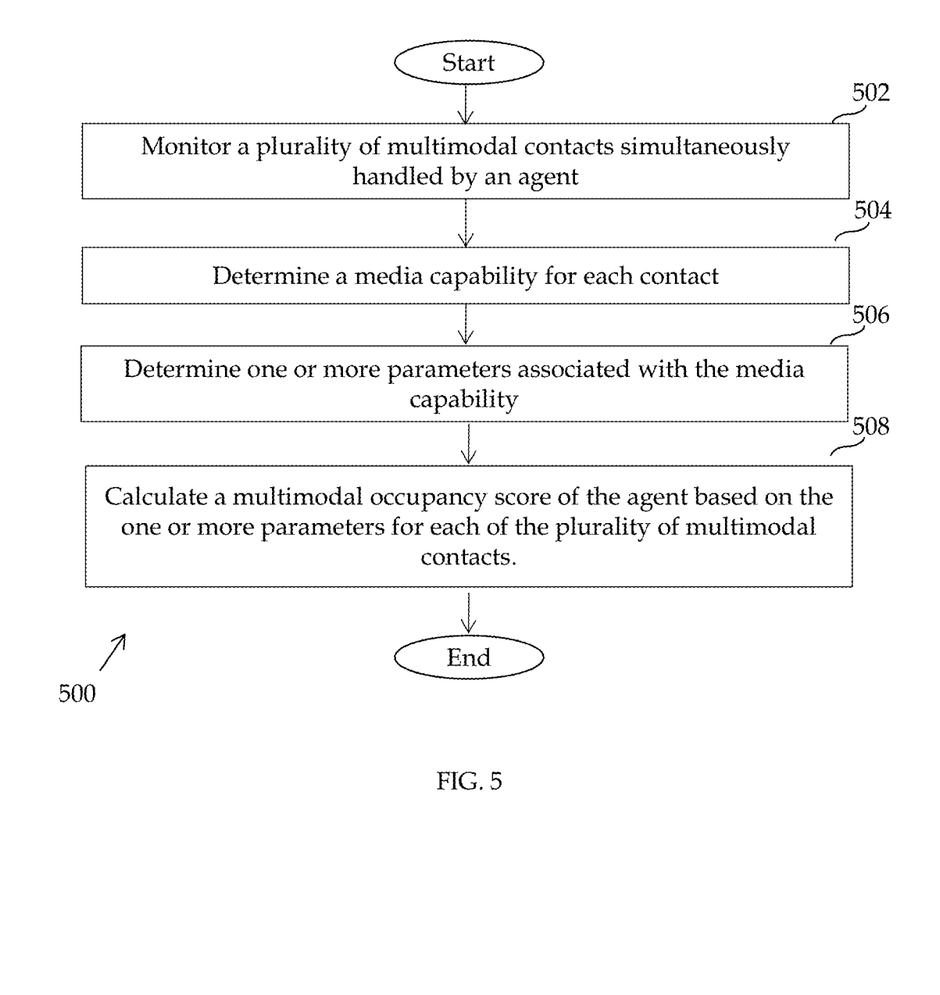
FIG. 5 illustrates a flow diagram of a method for determining occupancy of an agent in the contact center system of FIG. 1 handling simultaneous multimodal contacts, according to one embodiment of the present invention.

FIG. 5 illustrates a flow diagram of a method 500 for determining occupancy of an agent in a contact center system handling simultaneous multimodal contacts, according to one embodiment of the present invention. The embodiments of the method as depicted in FIG. 5 may be understood more clearly when read in conjunction with description of the previous figures, such as FIGS. 1, 2, 3 and 4. The order in which the method is performed is not intended to be construed as a limitation, and further any number of the method steps may be combined in order to implement the method or an alternative method without departing from the scope of the present invention.

At step 502, the method may monitor a plurality of multimodal contacts simultaneously handled by an agent. The contact center system may monitor the contacts handled by an agent in order to determine a multimodal occupancy score of an agent. As the contacts are multimodal, an agent is not necessarily completely occupied based on a single contact. Instead, an agent may need to handle two or more contacts simultaneously in order for the agent to remain sufficiently occupied. In an embodiment, the agent may want to have their multimodal occupancy score at a predetermined level over a time interval. For example, the agent may want a multimodal occupancy score of 85% for a day of work.

At step 504, a media capability may be determined for each contact received by the agent. The agent may receive a plurality of contacts and a media capability may be determined for each contact received. The media capability of a contact may include, but is not limited to, a voice capability, a video capability, a text capability or an email. In an embodiment, the contacts simultaneously handled by an agent may have one or more different capabilities. In an alternate embodiment, the contacts simultaneously handled by an agent may have one or more of the same capabilities. For example, the agent may handle four contacts that all have web chat capabilities. Alternatively, the agent may handle two contacts. One of those contacts may have an email capability and the other contact may have a web chat capability.

At step 506, one or more parameters associated with the media capability of each contact may be determined. In an embodiment, for each contact, one or more parameters are determined based on one or more of the contact, the media capability and the agent. For example, the media capability may be a text capability. One parameter may be the volume of text received and/or sent by the agent. The contact center system may determine a word length at which an agent is 100% occupied. This determined word length may be divided by the actual word length over a time interval to determine a parameter. The parameter may later be used to determine the multimodal occupancy score. In another example, the media capability may be a voice capability. The parameter may be the conversation length of the conversation between the customer and the agent. The contact center system may determine a conversation length at which an agent is 100% occupied. This determined conversation length may be divided by the actual conversation length over a time interval to determine a parameter used to determine the multimodal occupancy score.

In addition to the media specific parameters discussed above, other parameters or weights may be used to determine the multimodal occupancy score for an agent. A difficulty weight may be determined for each contact. A difficulty weight may be determined by how difficult a particular contact is for the agent. For example, a sales contact may be easier for an agent to handle than a complaint contact. As both sales and complaints contacts are different types of contacts, the type of contact may be used to determine the difficulty weight associated with that contact. Also, the agent may influence the difficulty weight given to the type of contact. For example, a skilled agent may have less difficulty handling a complaint call then a non-skilled agent. Similarly, an agent who usually handles complaints may have less difficulty handling a complaint call than an agent who mainly handles technical calls.

In an embodiment, a separation weight may be used to determine the multimodal occupancy score for an agent. A separation weight may be determined for each contact. A separation weight may be applied to determine the agent's multimodal occupancy score when an agent switched from a first contact to a second contact. The depth of separation weight module may be determined when an agent changes from one contact to another. In an embodiment, the depth of separation weight may be determined based on the media capability of the first contact when compared to the media capability of the second contact. In another embodiment, the depth of separation weight may be determined based on the type or contact type. Based on the depth of separation, the separation weight may be adjusted and increased from a regular depth of separation weight of one in order to take into account the more difficult depth of separation weights when determining the occupancy of the agent.

In an embodiment, a focus weight may be used to determine the multimodal occupancy score for an agent. The focus weight may be determined for each contact. The contact center system may determine a focus weight for an in-focus contact and a focus weight for one or more out of focus contacts. The in-focus contact may be the contact which the agent is currently responding. The other contacts, in which the agent is not currently interacting, are the out of focus contacts. In an embodiment, the focus weight may be based at least on one of the skill of the agent and the media capability. The focus weight may be different for a contact based on the media capability.

At step 508, a multimodal occupancy score of the agent may be calculated based on the one or more parameters for each of the plurality of multimodal contacts. The multimodal occupancy score may be calculated based on the parameters associated with the media capability for each contact. The multimodal occupancy score may be used as a metric to determine the percentage of time that an agent is working within a time interval.

The order in which the method is performed is not intended to be construed as a limitation, and further any number of the method steps may be combined in order to implement the method or an alternative method without departing from the scope of the present invention. It may be appreciated by a person skilled in the art that the embodiment of the method of the present invention may not be limited to the description of method FIG. 5. Further, various embodiments and steps may be implemented within the scope of the present invention.

The exemplary systems and methods of this present invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated that the components of the system can be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the present invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system to determine occupancy of an agent in a multimodal contact center, the system comprising:
   a memory device, storing executable instructions; and
   a processor in communication with the memory device, the processor when executing the executable instructions:
   monitors a plurality of multimodal contacts simultaneously handled by an agent;
   determines a media capability based on a contact for each of the plurality of multimodal contacts, and
   determines one or more parameters based on the media capability of the contact for each of the plurality of multimodal contacts; and
   calculates a multimodal occupancy score for the agent based on the one or more parameters for each of the plurality of multimodal contacts.

2. The system of claim 1, wherein the processor, when executing the executable instructions, determines a first media capability for a first contact and a second media capability for a second contact, wherein the first media capability is different than the second media capability.

3. The system of claim 1, wherein the processor, when executing the executable instructions, determines the one or more parameters based on the media capability of the contact and a skill level of the agent.

4. The system of claim 1, wherein the processor, when executing the executable instructions:
   automatically adjusts the one or more parameters.

5. The system of claim 1, wherein the processor, when executing the executable instructions:
   increases the multimodal occupancy score after an interval when the agent switches from a first contact to a second contact.

6. The system of claim 1, wherein the processor, when executing the executable instructions, determines a conversation length parameter when the media capability is a voice capability.

7. The system of claim 1, wherein the processor, when executing the executable instructions, determines a volume of text parameter when the media capability is a text capability.

8. The system of claim 1, wherein the processor, when executing the executable instructions, determines a focus weight based on the media capability; and wherein an in-focus contact has a greater focus weight than an out of focus contact.

9. A computer-implemented method to determine occupancy of an agent in a multimodal contact center, the method comprising:
   monitoring, by a processor, a plurality of multimodal contacts simultaneously handled by an agent;
   for each contact of the plurality of multimodal contacts,
      determining a media capability of a contact, and
      determining one or more parameters based on the media capability and the agent; and
   calculating a multimodal occupancy score for the agent based on the one or more parameters for each of the plurality of multimodal contacts.

10. The computer-implemented method of claim 9, comprising:
    automatically adjusting the one or more parameters based on the multimodal occupancy score.

11. The computer-implemented method of claim 9, comprising:
    increasing the multimodal occupancy score after a time interval when the agent switches from a first contact to a second contact.

12. The computer-implemented method of claim 9, wherein the one or more parameters comprises a conversation length parameter when the media capability is a voice capability.

13. The computer-implemented method of claim 9, wherein the one or more parameters comprises a volume of text parameter when the media capability is a text capability.

14. The computer-implemented method of claim 9, wherein the one or more parameters comprise a focus weight; and wherein an in-focus contact has a greater focus weight than an out of focus contact.

15. The computer-implemented method of claim 9, wherein the media capability comprises one of electronic mail, a text message, an instant message, a voice communication, and a video communication.

16. The computer-implemented method of claim 9, wherein the one or more parameters comprises a depth of separation weight based on an agent switching from a first contact to a second contact.

17. A non-transitory computer readable medium storing computer readable instructions when executed by a processor perform a method comprising:
   monitoring a first contact and a second contact simultaneously handled by an agent;
   determining a first media capability of the first contact and a second media capability of the second contact;
   determining one or more parameters based on the media capability of the first contact and one or more parameters based on the media capability of the second contact; and
   calculating a multimodal occupancy score for the agent based on the one or more parameters of the first contact and the one or more parameters of the second contact.

18. The non-transitory computer readable medium of claim 17, wherein the one or more parameters comprise a focus weight; and wherein the first contact has a greater focus weight than the second contact.

19. The non-transitory computer readable medium of claim 17, wherein the first media capability and the second media capability comprise one of electronic mail, a text message, an instant message, a voice communication, and a video communication.

20. The non-transitory computer readable medium of claim 17, wherein the first media capability is different than the second media capability.

\* \* \* \* \*